United States Patent [19]

Barton et al.

[11] Patent Number: 4,926,198
[45] Date of Patent: May 15, 1990

[54] LINEAR PRINTHEAD WRITER ASSEMBLY

[75] Inventors: James T. Barton, Fairport; Jimmy P. Walker, Rochester, both of N.Y.

[73] Assignee: Eastman Kodak Company, Rochester, N.Y.

[21] Appl. No.: 291,834

[22] Filed: Dec. 29, 1988

[51] Int. Cl.$^5$ ............................................. G01D 15/00
[52] U.S. Cl. ...................................... 346/155; 346/145; 346/160
[58] Field of Search ................... 346/155, 139 C, 160, 346/107 R, 108, 145; 358/300, 302

[56] References Cited

U.S. PATENT DOCUMENTS 4,703,334 10/1987 Mochimaru ......................... 346/155

Primary Examiner—Arthur G. Evans
Attorney, Agent, or Firm—Leonard W. Treash

[57] ABSTRACT

A linear printhead writer assembly has a rigid box-like support housing which independently supports and protects an LED printhead and a linear lens array. The housing has a front wall to which locating surface means are fixed and which are intended to engage locating bearing surfaces on a printer or similar apparatus.

10 Claims, 10 Drawing Sheets ered. In such structure the printhead assembly is subject not only to the forces of gravity but the forces necessary to hold it against the roller bearings.

LINEAR PRINTHEAD WRITER ASSEMBLY

RELATED APPLICATIONS

U.S. patent application Ser. No. 239,886, filed Sept. 2, 1988 in the names of J. T. Barton and J. P. Walker, entitled MOUNT FOR LINEAR ASSEMBLY.

U.S. patent application Ser. No. 273,770, filed Nov. 21, 1988 in the names of J. P. Walker and J. T. Barton, entitled ASSEMBLY CONTAINING A LINEAR FOCUSING MEANS AND METHOD OF MAKING SAME.

U.S. patent application Ser. No. 279,737, filed Dec. 5, 1988 in the name of Doug Hons, entitled MECHANISM FOR ACCURATELY MOUNTING AN ELECTRONIC LIGHT EMITTING PRINTHEAD ASSEMBLY.

TECHNICAL FIELD

This invention relates to a linear printhead writer assembly and more specifically, to an assembly having a rigid support housing for supporting a linear printhead and a linear focusing means.

BACKGROUND ART

U.S. Pat. No. 4,728,981 issued Mar. 1, 1988 to K. C. Koek et al shows an LED printhead assembly. The assembly includes a linear lens array and a printhead. The printhead includes a conventional linear array of LED's on a suitable support (generally with a transparent faceplate and a cooling means). The patent discloses a mechanism for mounting the LED printhead and the lens structure with respect to each other and also with respect to a web-type electrophotographic apparatus. That particular mounting structure is used commercially on high-speed, high-volume, non-impact printers. In this prior assembly the lens structure is mounted on a pair of stiffeners which are then attached directly to the printhead. Thus, the lens array is supported by the printhead.

Our co-pending application Ser. No. 273.770 entitled ASSEMBLY CONTAINING A LINEAR FOCUSING MEANS AND METHODS OF MAKING SAME, filed on Nov. 21, 1988 shows an improvement in the mounting structure over the Koek et al device in which the linear printhead and the focusing means are fixed with respect to each other by fixing a lens stiffener holding the focusing means to a flange connected to the printhead. The focusing means and printhead flange are connected by special screw and washer fasteners that allow adjustment of their relative positions prior to adhesively affixing the washers to the flange. With this arrangement precise optical location of the printhead and focusing means can be obtained very inexpensively. A gap between the heads of the screws and the washers provide thermal compensation for the greater heating up of the printhead compared to the focusing means during operation.

In each of these structures the printhead and focusing means are optically fixed with respect to each other by precisely connecting them together and the resulting assembly is mounted in the apparatus by connecting one or the other of the previously mentioned components directly to a printer frame at a position known to be correct for proper focusing of the LED's onto the appropriate surface. Because these structures are designed to rigidly fit in the frame of the printer they are reasonably resistant to displacement because of gravity or other forces associated with the mechanism.

DISCLOSURE OF THE INVENTION

In our co-pending U.S. patent application Ser. No. 239,886 filed Sept. 2, 1988 entitled MOUNT FOR LENS ASSEMBLY, a mount for a linear printhead assembly is shown in which the mount is urged against bearings for a roller which roller supports a web upon which an image of the LED's is projected. The mount is spring urged against the roller bearings and follows the roller itself thereby maintaining precise focus despite any displacement of the roller with respect to the frame of the printer for whatever reason. In such structure the printhead assembly is subject not only to the forces of gravity but the forces necessary to hold it against the roller bearings.

It is the object of the invention to provide a linear printhead writer assembly for use in such a mount.

It is another object of the invention to provide a writer assembly in which a linear printhead and a linear focusing means are precisely optically mounted with respect to each other and are readily optically alignable in a printer, or the like, but which assembly can withstand substantial external forces without losing optical alignment.

This and other objects are accomplished by a linear printhead writer assembly which includes in addition to a linear printhead and linear focusing means, a rigid support housing which support housing includes locating surface means for locating the support housing with respect to an exposure locus, means for mounting the printhead directly to the support housing and means for mounting the focusing means directly to the support housing. The printhead and the focusing means are mounted independently of each other and are entirely supported by the support housing.

According to a preferred embodiment the support housing is a rigid box-like structure which substantially surrounds and protects both the printhead and the focusing means. A front wall in the support housing supports the locating surface means and has an opening for the optical path of the focusing means. Opposing end wall means of the support housing contain apertures in which screw and washer arrangements provide for mounting of both the printhead and the focusing means.

According to a further preferred embodiment, the box-like housing is formed of front and rear portions. The front portion has a front wall and has end walls to which the focusing means is mounted. The rear portion has end walls to which the printhead is mounted. Each portion of the box-like structure contain top and bottom walls with vertical flanges which flanges are fixed together to fix the portions together. The flanges create a rigid support rib running the length of the assembly.

With this writer assembly the rigid housing absorbs the forces required to support and position the printhead and the focusing means relative to the exposure surface as well as forces created by the weight of the assembly. Any force in fact transmitted to one of the optical components is not necessarily transmitted to the other because of their independent mounting. Other advantages will become apparent as the preferred embodiment is described.

BEST MODE OF CARRYING OUT THE INVENTION

Although this invention can be used with other types of apparatus, it will be illustrated by its most probable application in a nonimpact electrophotographic printer using an LED printhead.

Figure 1:
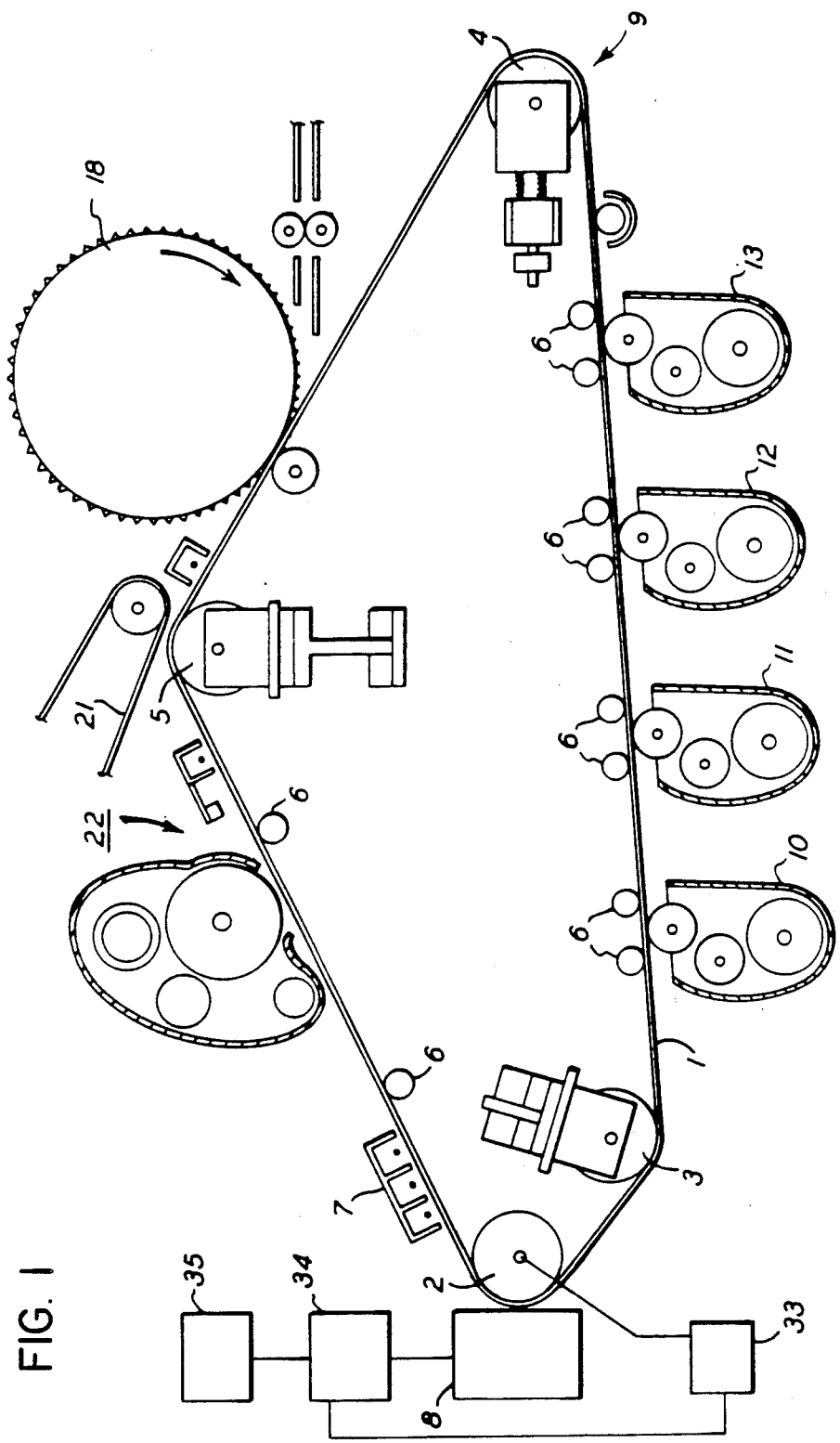
FIG. 1 is a schematic side view of an electrophotographic apparatus of a type in which the invention is useful.

According to FIG. 1 an electrophotographic printer includes a removable film core generally designated as 9 which includes an endless electrophotographic web, belt or film 1 trained about a series of rollers 2, 3, 4 and 5 and film skis 6. The rollers and skis are attached to side plates shown, in part, in FIGS. 11-13 and which make up the film core and which can be removed from the apparatus for replacement of the belt 1. In the basic electrophotographic process the belt 1 has one or more photoconductive layers on it. The belt is uniformly charged at a charging station 7 then exposed at an exposure station 8 and toned at one of toner stations 10, 11, 12 or 13. The resulting toner image is transferred to a receiving sheet at transfer station 18 and the receiving sheet is separated from the belt 1 and transported to a fuser, not shown, by a transport mechanism 21. The belt is then cleaned at a cleaning station 22 for reuse in the process, all as is well known in the art. Four toner stations 10, 11, 12 and 13 are shown permitting the application of four different colored toners to a plurality of images on the belt, which images can be transferred in registration at transfer station 18 to make a multicolor image, also as is well known in the art.

The exposure station 8 includes an LED printhead which will be described in more detail with reference to the other figures. It is driven by suitable electronics 34 as controlled by an encoder 33 which monitors the rotational displacement of printhead roller 2, also as is well known in the art. The suitable electronics 34 may receive information from a scanner, a computer, a memory or other similar source 35.

Figure 2:
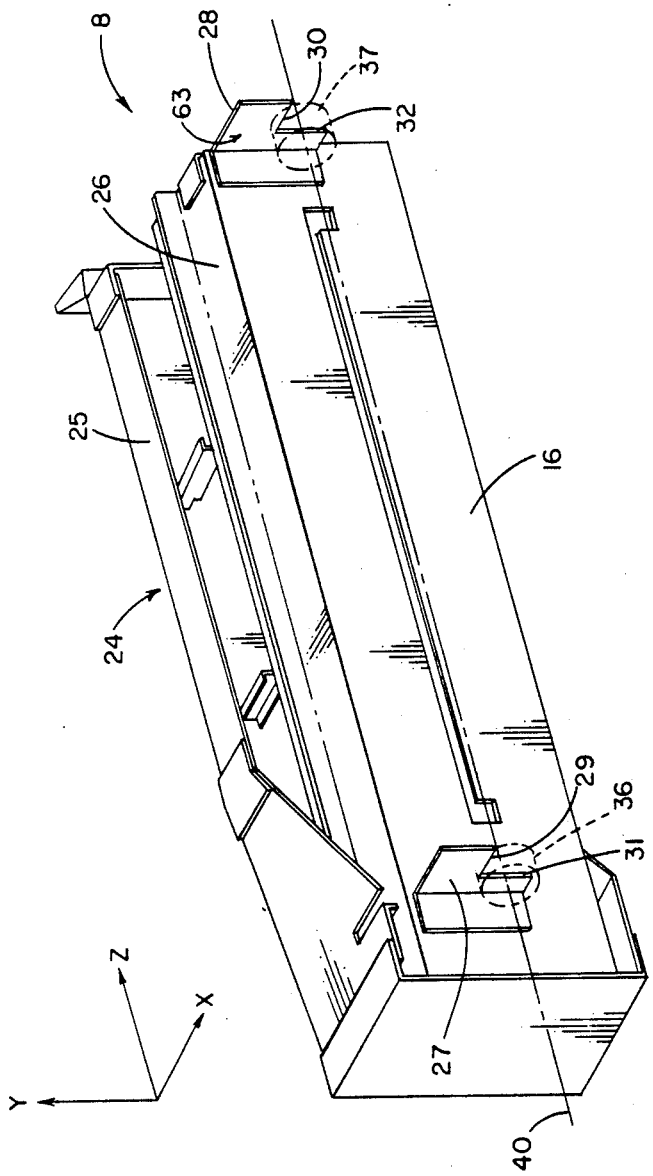
FIG. 2 is a perspective view of an exposure station portion of the apparatus shown in FIG. 1.
Figure 3:
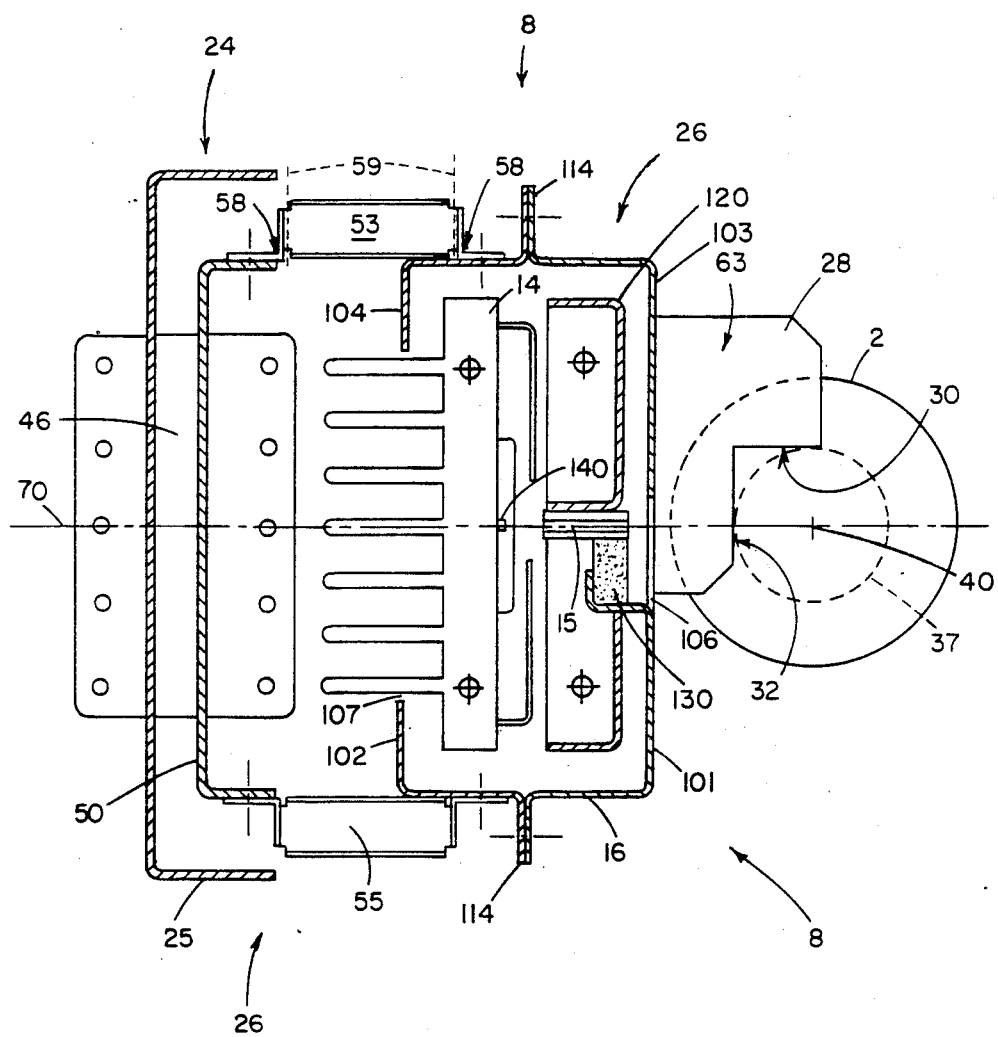
FIG. 3 is a side cross-section of the exposure station shown in FIG. 2, the side cross-section being taken along the lines 3—3 shown in FIG. 13.

According to FIGS. 2 and 3, the exposure station 8 includes a printhead assembly and a mount 24 for the printhead assembly. The printhead assembly includes both a linear printhead 14, having a linearly arranged source or source of radiation, for example, LED's 140 and a linear focusing means, for example, a conventional gradient index lens array 15. The LED printhead 14 and the lens array 15 are optically located with respect to each other by a rigid box-like support housing 16 and define an optical axis or axes 70. The rigid support housing 16 includes locating members 27 and 28 having orthogonal, relatively linear locating surfaces 29 and 30 which are parallel to the x axis and 31 and 32 which are parallel to the y axis. A planar locating surface 63 is located on location member 28.

The printhead assembly 14 and 15 and support housing 16 with locating members 27 and 28 are precisely constructed as a unit, herein called a "printhead writer assembly" 26 which is the subject of this invention. Accuracy of the system in high resolution printing depends upon the accuracy in locating printhead 14 and lens 15 with respect to locating surfaces 29–32 and each other. The rest of the exposure station 8 serves to hold the writer assembly in position with respect to printhead roller 2 and is the subject of our co-pending U.S. patent application Ser. No. 239,886 filed Sept. 2, 1988 entitled "Mount for Linear Assembly".

Locating surfaces 29–32 are intended to mate with bearing surfaces 36 and 37, shown in phantom in FIG. 2 and which are part of printhead roller 2. Bearing surfaces 36 and 37 could also be part of the mounting structure for roller 2, providing they maintain a precise relation with roller 2. Bearing surfaces 36 and 37 are locating surfaces which cooperate with locating surfaces 29–32 to position the printhead assembly so that an image of LED's 140 is projected by lens 15 in focus on belt 1 as belt 1 is supported by printhead roller 2.

Figure 4:
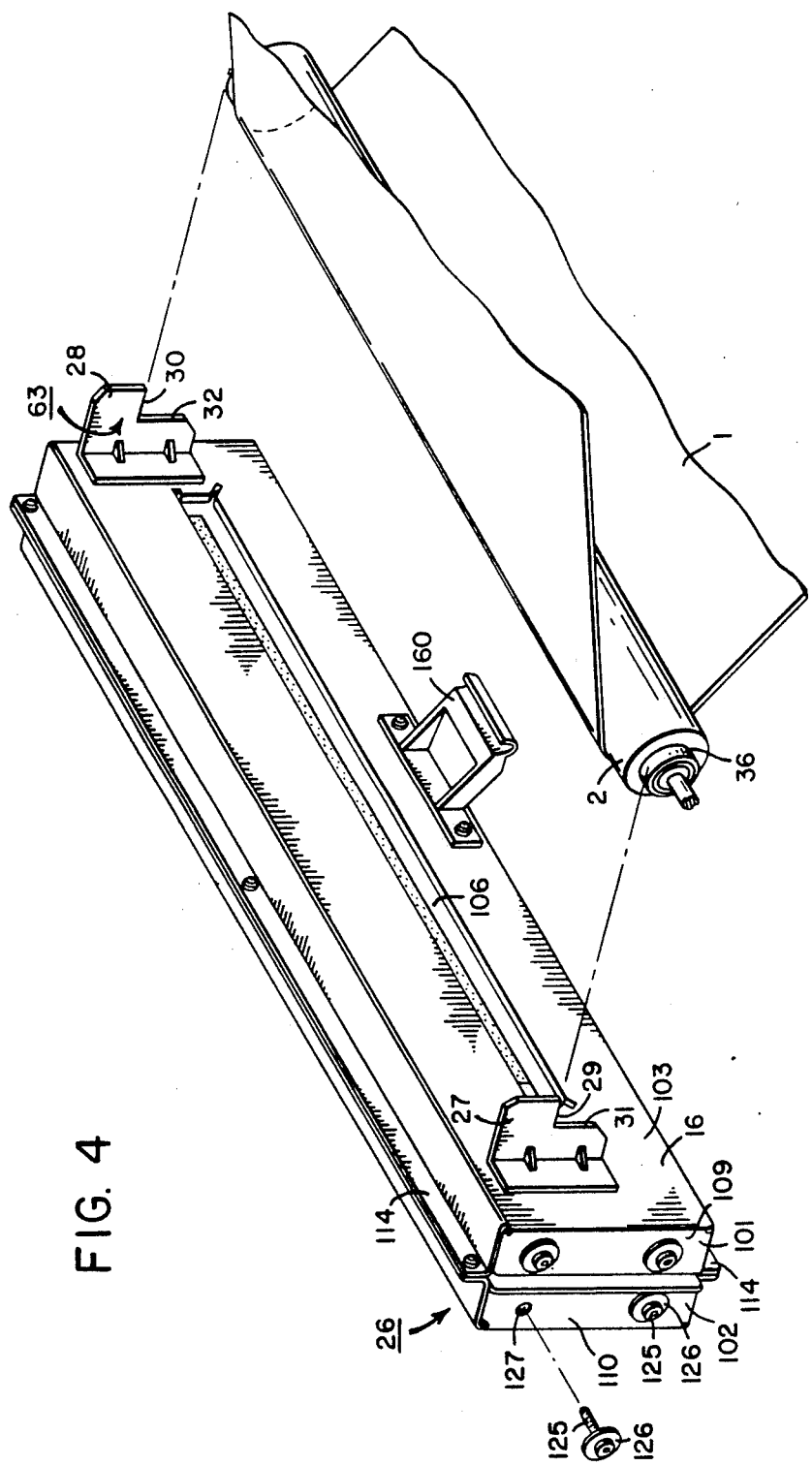
FIG. 4 is a perspective view partially exploded of a writer assembly constructed according to the invention.
Figures 5, 5A:
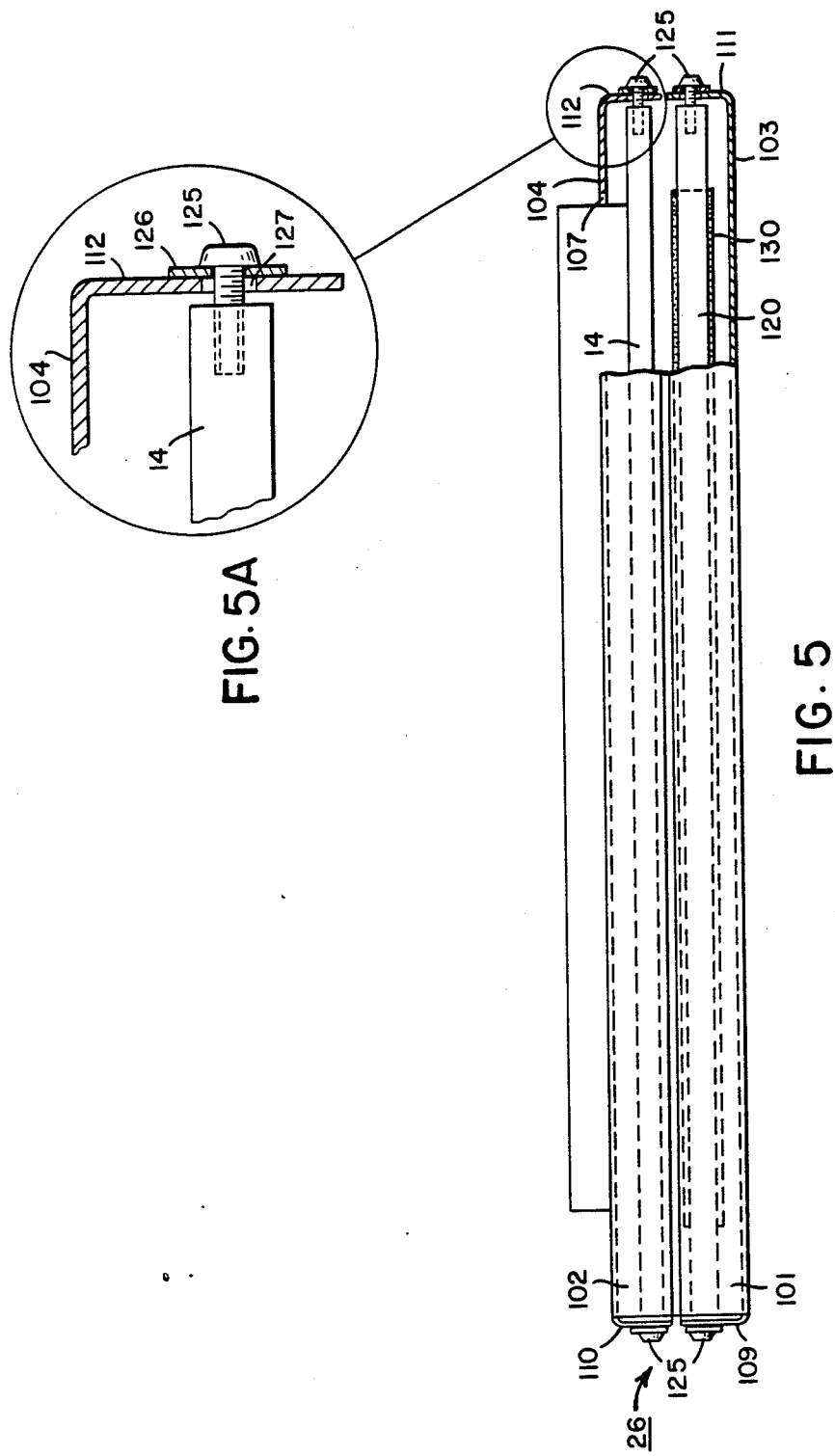
FIG. 5 is a top view of the writer assembly shown in FIG. 4 with some parts missing and with a portion shown in section.
FIG. 5A is a portion (circled) separated out of FIG. 5 on an enlarged scale.

The printhead writer assembly 26 can be best seen with respect to FIGS. 3–5. Rigid box-like support housing 16 includes a front housing portion 101 and a rear housing portion 102. The front housing portion 101 includes a front wall 103 to which locating members 27 and 28 (not shown in FIG. 5) are fixed and also includes an elongated aperture 106. Rear housing portion 102 has a rear wall 104 with a rear aperture 107.

Front and rear housing portions 101 and 102 each have end walls 109, 110, 111 and 112. Top and bottom walls to each housing portion contain right-angle flanges 114 which can be bolted, screwed or riveted together to form the completed support housing 16.

Linear printhead 14 is attached to rear housing portion 102 and lens array 15 is attached to front housing portion 101 by a structure and procedure more completely described in our U.S. patent application Ser. No. 273,770, filed Nov. 21, 1988, entitled ASSEMBLY CONTAINING A LINEAR FOCUSING MEANS AND METHOD OF MAKING SAME. Lens array 15 is fixed to a lens stiffener 120. As best seen in FIG. 5, fastening pins, for example, screws 125 are placed through washers 126 and through large apertures 127 in end walls 109 and 111 in front housing portion 101 and into lens stiffener 120. Similarly, printhead 14 which supports LED's 140 is mounted in similar apertures 127 in end walls 110 and 112 in rear housing portion 102.

In assembly, printhead 14 and lens array 15 are separately mounted in rear housing portion and front housing portions 102 and 101, respectively, with the screws 125 loosely in apertures 127. The two housing portions are then attached together at flanges 114 and the entire writer assembly 26 is mounted on a suitable optical instrument which includes members which simulate bearing surfaces 36 and 37 and web 1 for which the writer assembly 26 is intended. More specifically, locating members 27, 28 with locating surfaces 29–32 are placed on bearing surfaces simulating bearing surfaces 36 and 37. Fixed with respect to the surfaces simulating bearing surfaces 36 and 37 is a surface which simulates the web 1, i.e., the exposure locus of the apparatus, which surface can be a suitable reflecting surface upon which an image of the LED's 140 can be visually examined, a detector or a mirror to reflect that image to a detector. LED's 140 are turned on and the image is examined visually or electronically at the simulated exposure locus. Screws 125 are moved to the extent allowed by apertures 127 until LED's 140 and lens array 15 are positioned to project a focused image of LED's 140 at the desired locus. At this point, washers 126 which contain apertures which are a tight fit with screws 125 are adhesively fixed to end walls 109, 110, 111 and 112 to fix printhead 14 and lens array 15 in optically aligned positions. At this point, writer assembly 26 can be attached to the rest of the exposure station 8 for mounting in apparatus having printhead roller 2, belt 1 and bearing surfaces 36 and 37. Further adjustment within writer assembly 26 is not necessary providing the relationship between bearing surfaces 36 and 37 and belt 1 are the same for the printer as their simulated counterparts.

Rigid box-like support housing 16 is made of fairly heavy gauge metal (for example, 0.062 inch steel) which is not readily deformed. The lens array 15 and printhead 14 are not directly connected to each other but are instead fixed to separate housing portions 101, 102 of the rigid housing 16. With this structure, optical alignment of the LED's 140 and lens array 15 with locating members 27 and 28 is readily maintained despite substantial handling. It has been found that with this structure realignment in the field is not necessary and, in fact, if constructed as specifically described is not possible. If one of the optical components is or becomes misaligned, that misalignment is not passed on to the other component because of the independence of their mounting.

In usage, the LED's generate heat as well as light. Thus the printhead will heat up and expand relative to the housing 16. This is compensated for by movement of the head of screws 125 supporting printhead 14, away from washers 126 as the screws move in the holes in the washers as printhead 14 expands.

A foam insert 130 positioned below the front portion of lens array 15 serves to trap stray light and provides a contamination barrier for dust.

None of the parts used in the writer assembly 26 require machined or precise tolerances. Cost is extremely low for volume production.

Even though the housing is a two-part structure, flanges 114 form a central stiffening rib which resists bending and twisting in the focal direction. Thus, a highly rigid structure is realized without having to make the printhead and lens stiffener extremely thick themselves.

Because the writer assembly is accurately positioned relative to belt 101 and also because it is a very rigid structure it can be used to locate other components in the apparatus. For example, a mount 160 for an electrometer is shown in FIG. 4 attached to the front wall of front housing portion 101. With this structure an electrometer carried in mount 160 can have a very precise location with respect to belt 1 without an additional separate mounting for it.

Printhead roller 2 will have variations in position and orientation. This is due to manufacturing tolerances in general and the fact that it is in a film core 9 which is removable. The location of roller 2 with respect to the frame of the apparatus is through the core and its mounting (not shown). The focal length of the lens array 15 is extremely short, giving very little depth of focus and requiring precise positioning of the printhead assembly with respect to roller 2. Mount 24 has been designed to maintain that precise positioning despite previously mentioned variances in position and orientation of roller 2.

FIG. 2 shows a set of three orthogonal axes x, y and z which will be used to better explain the operation of mount 24 (which is the subject of copending application U. S. Ser. No. 239,886, cited above). The x axis is parallel to optical axes 70 (FIG. 3). The z axis (FIG. 2) is parallel to the primary axis 40 of roller 2. The y axis is a vertical axis (as shown) and is orthogonal to the x and z axes. Because roller 2 rotates about primary axis 40, there is a tendency for the writer assembly 26 also to rotate about the primary axis. This rotating is prevented by mount 24 by virtually all other types of movement with change in position and orientation of roller 2 are permitted by a set of flexure members supporting the writer assembly 26 with respect to the frame of the apparatus.

These flexure members can best be seen in FIGS. 6–10. According to FIGS. 6 and 7 a support arm 25 is mounted to a portion of the frame 41 of the apparatus through a flexure hinge 42 formed by first and second flexure members 43 and 44. Flexure members 43 and 44 are attached by suitable means shown in FIG. 6 to adjoining corner surfaces of support arm 25 and to similar surfaces on a support 45. Support 45 is rigidly fastened to frame 41. The first and second flexure members are made of any durable metal such as steel having a stiffness which resists but permits some bending and twisting. The stiffness thus gives the support arm 25 a strong nominal position determined by the orientation of the corner surfaces of support 45. It also permits some rotational movement of the support arm 25 around the y axis as shown in FIG. 3. Movement about the x axis is prevented by the first flexure member 43, while movement about the z axis is prevented by the second flexure member 44.

Figure 6:
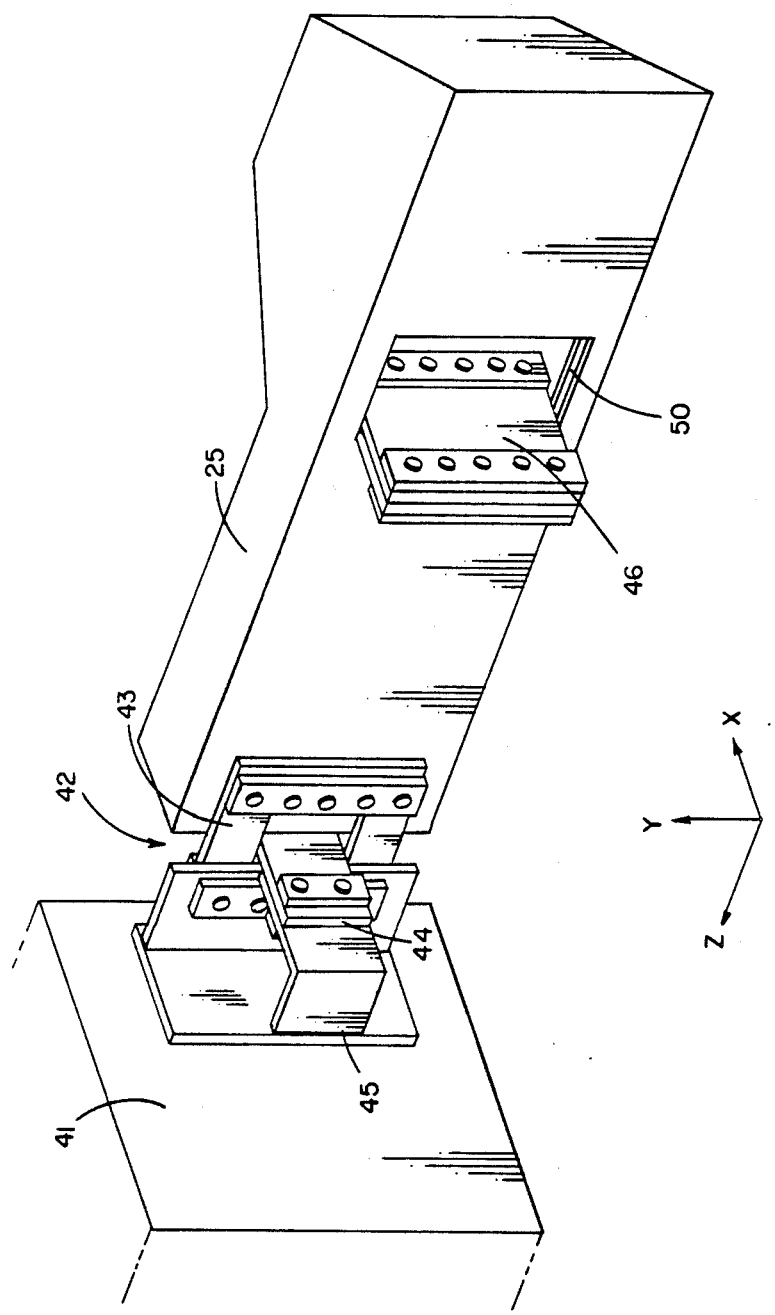
FIGS. 6 and 8 are rear and front perspective views, respectively, of a support arm forming part of the exposure station shown in FIG. 2.
Figure 7:
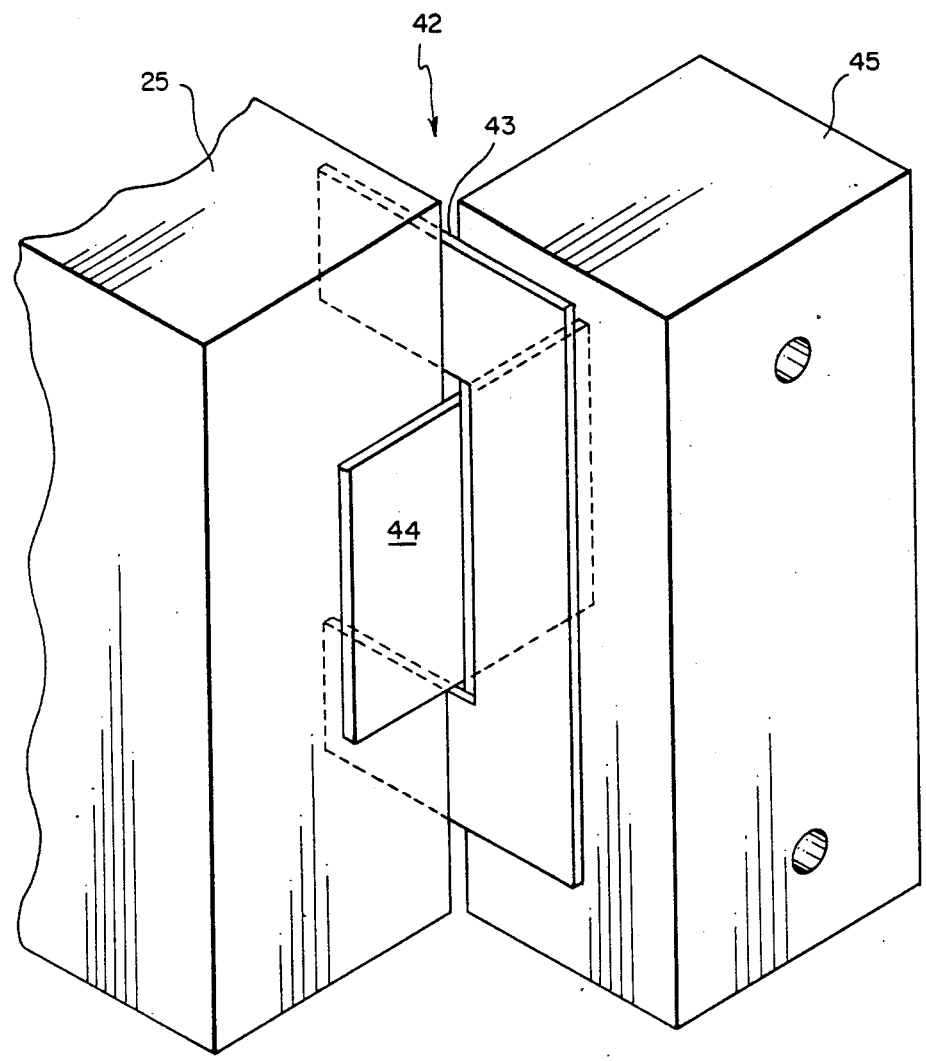
FIG. 7 is a perspective view of a flexure hinge also shown in FIG. 6.
Figure 8:
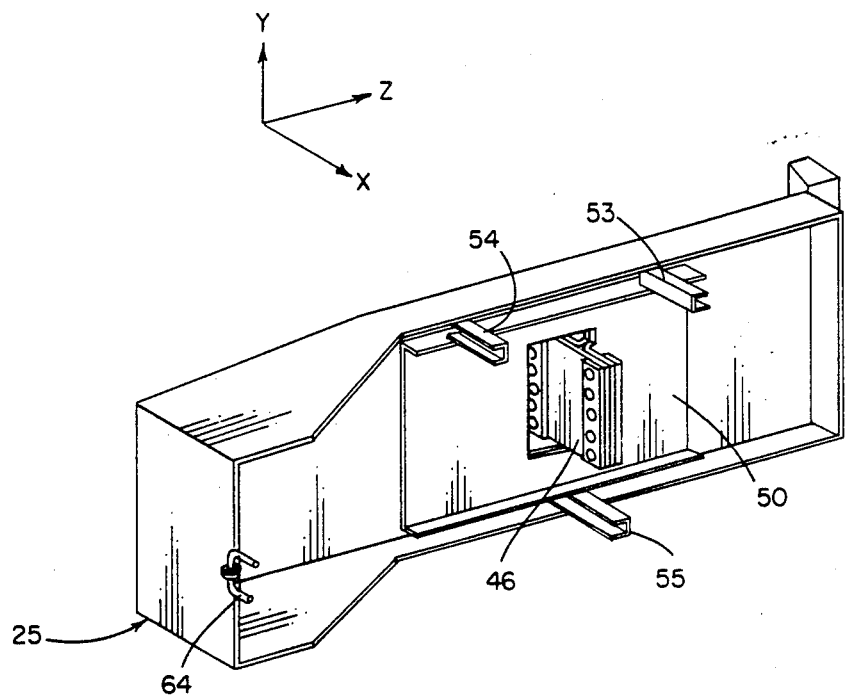

Referring now to FIGS. 6 and 8, a flexure plate 50 is mounted to support arm 25 by a third flexure member 46. Third flexure member 46 permits rotation of flexure plate 50 around the y axis by normal bending and around the x axis by twisting. It is mounted as shown prohibiting rotation around the z axis.

Figure 9:
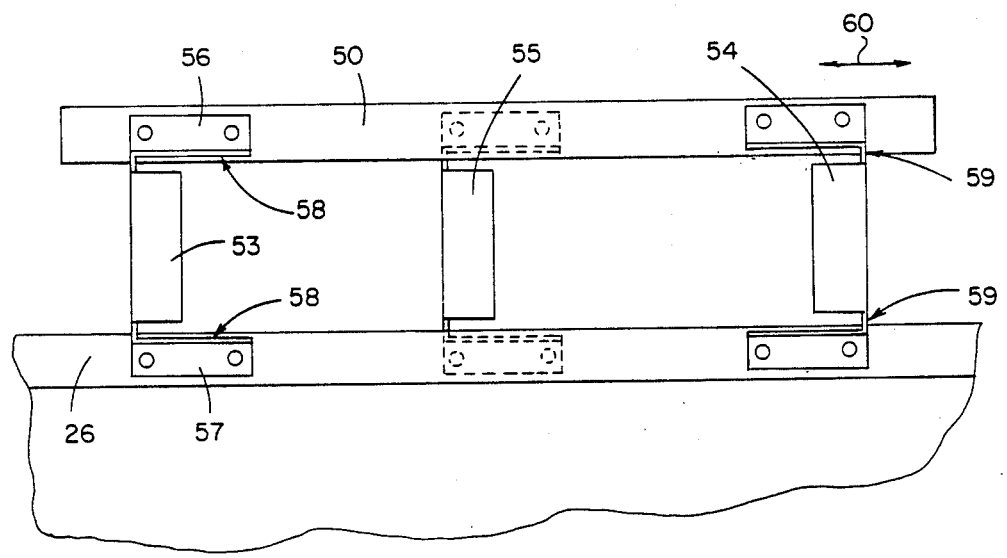
FIG. 9 is a top view with many portions eliminated illustrating the mounting of three flexure arms in the exposure station shown in FIG. 2.
Figure 10:
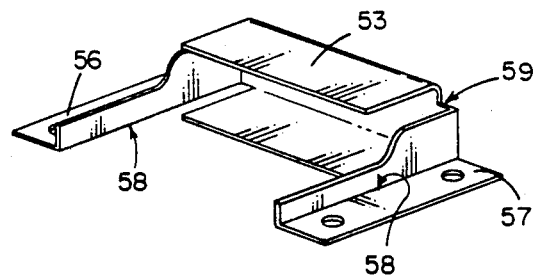
FIG. 10 is a perspective view of one of the flexure arms shown in FIG. 9.

Flexure plate 50 is mounted to the writer assembly 26 by three flexure arms 53, 54 and 55 shown in FIGS. 8, 9 and 10, which become fourth, fifth and sixth flexure members. Flexure arms 53 and 54 are located at the top of plate 50 and flexure arm 55 is located at the bottom of plate 50. As shown in FIG. 9, flexure arm 53 is attached to plate 50 by flange 56 and to the writer assembly 26 by a flange 57. Flexure arms 54 and 55 are similarly mounted. As seen in FIG. 10 flexure arm 53 is bendable along lines 58 permitting movement of the writer assembly 26 relative to plate 50 in a vertical direction as shown in FIG. 2, that is, generally parallel to the y axis. The flexure arm 53 is bendable along vertical lines 59 which permits movement of writer assembly 26 relative to plate 50 parallel to the z axis as shown by arrow 60 in FIG. 9. Rotational movement around any of the axes is prevented because the flexure arms are not compressible thereby forcing the writer assembly 26 and plate 50 to remain parallel.

Figure 11:
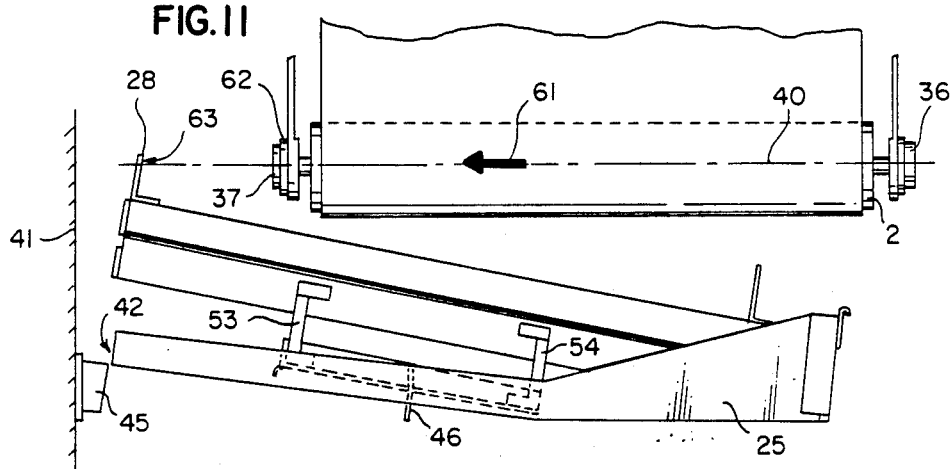
FIGS. 11, 12 and 13 are top views of a portion of the electrophotographic apparatus shown in FIG. 1, illustrating the replacement of a film core with respect to the exposure station shown in FIG. 2.
Figure 12:
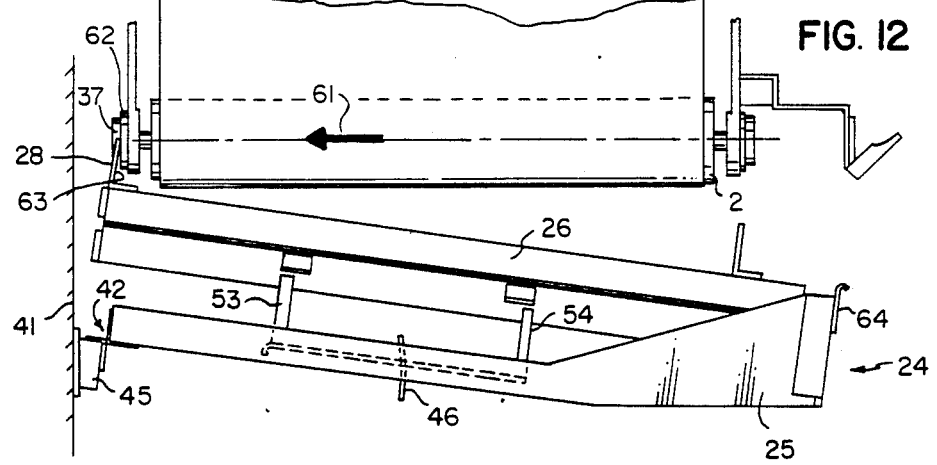
Figure 13:
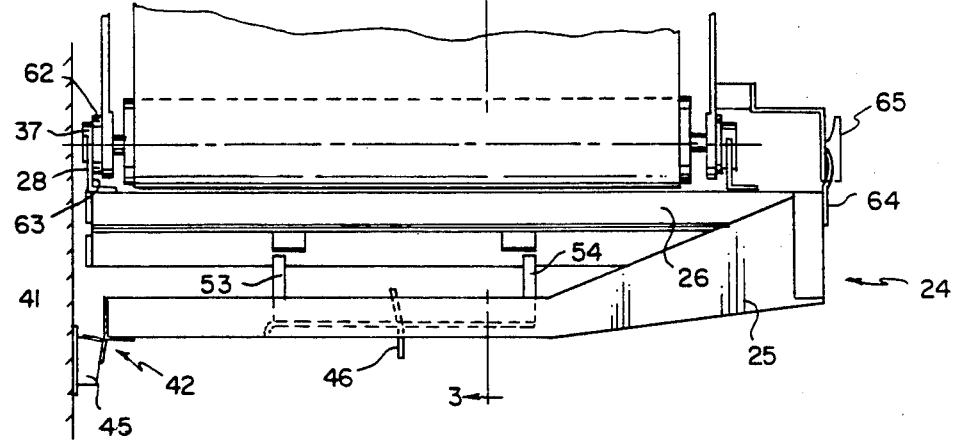

FIGS. 11, 12 and 13 are top views of the mount illustrating insertion of a film core in the apparatus. The corner surfaces on support 45, to which the first and second flexure members 43 and 44 are attached, are slightly oblique to the frame 41 so that when no film core is in the apparatus, support arm 25 tilts to the rear at a slight angle from perpendicular to frame 41, for example, 7½ degrees as shown in FIGS. 11 and 12. Writer assembly 26 also tilts rearward, as shown in FIG. 11, relative to support arm 25 as controlled by the angle of the support surfaces for the third flexure member 46. Further, writer assembly 26 has a center of gravity that causes its right end (FIG. 11) to tilt downward compared to support arm 25 with locating member 27 generally below locating member 28.

As the film core is inserted in the apparatus, printhead roller 22 moves generally in the direction shown by arrow 61. The mount 24 follows the roller 2 to assume its proper operative position with respect to roller 2 by the interaction of several surfaces. An end surface 62 of roller 2 contacts a flat locating surface 63 of locating member 28, which faces right in FIGS. 11–13, to urge writer assembly 26 toward the left and also to rotate writer assembly 26 counterclockwise around the y axis. The front corner of locating surface 29 (FIG. 2) is rotated into contact with bearing surface 36 and as writer assembly 26 rotates about the y axis surface 29 rides up on the bearing surface 36 causing comparable locating surface 30 (FIG. 2) on locating member 28 to rotate down onto bearing surface 37. The early part of the rotation of writer assembly 26 is permitted by third flexure 46 (compare FIGS. 11 and 12), while the second portion of that movement is a combination of flexure about third flexure member 46 and movement of support arm 25 around flexure hinge 42 (compare FIGS. 12 and 13). At the same time, flexure arms 53, 54, and 55 are permitting movement of writer assembly 26 generally parallel to the z axis, to the left as shown in FIGS. 11 and 12 and some movement parallel to the y axis in an upward direction. These combinations of permitted movements on the part of the mount 24 cause the mount to assume its correction location, shown in FIG. 13, with little, if any, attention paid to it by the service person while the core is being inserted. The movement about spaced flexure means 43, 44, and 46 both permitting rotation around the y axis permits the substantial open angle of writer assembly 26 in FIG. 11 without a large angle and movement by support arm 25.

Once the core is in place, flexure arms 53, 54 and 55 are holding locating surface 63 against end surface 62 to assure proper location of the printhead assembly parallel to the z axis. Similarly, flexure arms 53, 54 and 55, having been flexed somewhat to permit the front printhead support 26 to move upward, now exert some downward force, holding locating surfaces 29 and 30 against bearing surfaces 36 and 37, respectively (See FIG. 2). A flexure clasp 65 on film core 9, similar to those used for many years on ski boots and the like, is fastened to complementary fastening structure 64 on support arm 25 to lock the mount 24 in place and urge locating surfaces 31, 32 against bearing surfaces 36 and 37. Once assembled, small changes in position of roller 2 around either the x or y axis or parallel to any of the three axes are permitted by the third flexure member 46 and the flexure arms 53, 54 and 55 with the printhead assembly maintaining its operative relation with respect to the roller 2 and web 1. None of the flexure members permit rotation of the printhead assembly or the mount about the primary axis 40 of roller 2, i.e., about the z axis.

While the invention has been described in connection with a preferred embodiment thereof, it will be understood that variations and modifications can be effected within the spirit and scope of the invention as described hereinabove and as defined in the appended claims.

We claim:

1. A linear printhead writer assembly comprising:
   a linear printhead having a linearly arranged source of radiation,
   a linear focusing means,
   a rigid support housing, said support housing including
      locating surface means for locating said support housing with respect to an exposure locus,
      means for mounting said printhead directly to said support housing independent of said linear focusing means to be entirely supported thereby,
      means for mounting said focusing means directly to said support housing independent of said linear printhead to be entirely supported thereby,
   said focusing means and said printhead being positioned to project an image of said printhead at said exposure locus.

2. An assembly according to claim 1 wherein said rigid support housing includes a front housing portion and a rear housing portion, the front housing portion includes the means for mounting the focusing means and the rear housing portion includes the means for mounting the printhead.

3. An assembly according to claim 2 wherein said front and rear housing portions each contain top and bottom walls and flanges extending from each of said bottom and top walls in a direction vertically away from said assembly, and further wherein said top wall flanges are fixed together and said bottom wall flanges are fixed together to form elongated, rigid support ribs and to rigidly fix said front and rear housing portions together.

4. A linear printhead writer assembly comprising:
   a linear printhead having linearly arranged source of radiation,
   a linear focusing means,
   a rigid box-like support housing having a front wall and opposing end wall on the side of said linear focusing means opposite said printhead means,
   locating surface means fixed to said front wall for locating said support housing with respect to an exposure locus,
   means mounting said printhead between said end wall means,
   means mounting said focusing means between said end walls means,
   said focusing means and said printhead being mounted in positions to project an image of said printhead at said exposure locus.

5. An assembly according to claim 4 wherein said end wall means includes means defining a plurality of apertures and wherein said assembly further includes a pin inserted in each aperture and fixed in said printhead, a washer around each pin having a hole approximating the diameter of the pin which washer is adhesively fixed to the end wall defining the aperture through which its pin extends to mount said printhead between said end wall means.

6. A linear printhead writer assembly comprising:
an LED printhead,
a linear lens array,
a rigid box-like support housing supporting and substantially surrounding said printhead and lens array, said housing including locating surface means for locating said support housing with respect to an exposure locus.

7. An assembly according to claim 6 for use in a reproduction device having a series of components past which a light sensitive member moves, said writer assembly being one of said components and wherein said assembly further includes a support for another of said components which support is rigidly affixed to said rigid box-like support housing.

8. An assembly according to claim 6 wherein said box-like support housing includes a front wall having an aperture through which an optical path of said printhead and lens array extend and said locating surface means are defined by two rigid locating members extending from said front wall which locating members each define two locating surfaces which extend at right angles to each other.

9. An electrophotographic printer including means for supporting an electrophotosensitive member for movement through an endless path and a series of stations for forming visible images on said member as it moves through said path, one of said stations being an exposure station includung a writer assembly according to claim 6.

10. An electrophotographic printer including a series of rollers for supporting an electrophotographic web for movement through an endless path and a series of stations for forming visible images on said member as it moves through said path, one of said stations being an exposure station including a writer assembly according to claim 8 operatively positioned with respect to said web as said web is supported by one of said rollers, said one roller having integral bearing surfaces, and wherein said locating surfaces are adapted to mate with said bearing surfaces.

* * * * *